United States Patent

Baum

Patent Number: 5,114,144
Date of Patent: May 19, 1992

[54] COMPOSITE BASEBALL BAT

[75] Inventor: Charles S. Baum, Traverse City, Mich.

[73] Assignee: The Baum Research & Development Company, Inc., Traverse City, Mich.

[21] Appl. No.: 518,782

[22] Filed: May 4, 1990

[51] Int. Cl.$^5$ ............................................. A63B 59/06
[52] U.S. Cl. .................... 273/72 R; 428/35.6; 273/73 J; 273/26 B; 440/107
[58] Field of Search .................... 273/67, 72, DIG. 23, 273/DIG. 8, 82 R, 80.3, 73 J; 428/106, 285, 35.6; 156/245; 440/101

[56] References Cited

U.S. PATENT DOCUMENTS

| | | | |
|---|---|---|---|
| 2,379,006 | 6/1945 | Johnson | 273/67 D |
| 2,793,859 | 5/1957 | Darling et al. | 273/72 R |
| 4,014,542 | 3/1977 | Tanikawa | 273/72 R |
| 4,200,479 | 4/1980 | Ardell et al. | 273/80.3 |
| 4,543,284 | 9/1985 | Baum | 428/106 |
| 4,572,508 | 2/1986 | You | 273/DIG. 23 |
| 4,615,936 | 10/1986 | Baum | 428/285 |
| 4,689,257 | 8/1987 | Baum | 273/82 R |
| 4,705,273 | 11/1987 | Ament et al. | 273/DIG. 8 |
| 4,848,745 | 7/1989 | Bahannan et al. | 273/67 R |
| 4,931,124 | 6/1990 | Baum | 156/245 |

*Primary Examiner*—William H. Grieb
*Assistant Examiner*—Mark S. Graham
*Attorney, Agent, or Firm*—Krass & Young

[57] ABSTRACT

A wood composite baseball bat is formed by overlaying a central core of foamed plastic or extruded aluminum with an inner layer of resin-impregnated fiber knitted or woven cloth and then an outer layer consisting of longitudinally extending planks of resin-coated wood veneer. The article is formed by covering the core with the synthetic material impregnated with uncured resin. While the resin impregnating the fibrous material is still unset, the core member is placed within split molds lined with resin-coated strips of wood veneer and the molds are pressed together while the resin is allowed to set to form a unitary mass.

25 Claims, 2 Drawing Sheets

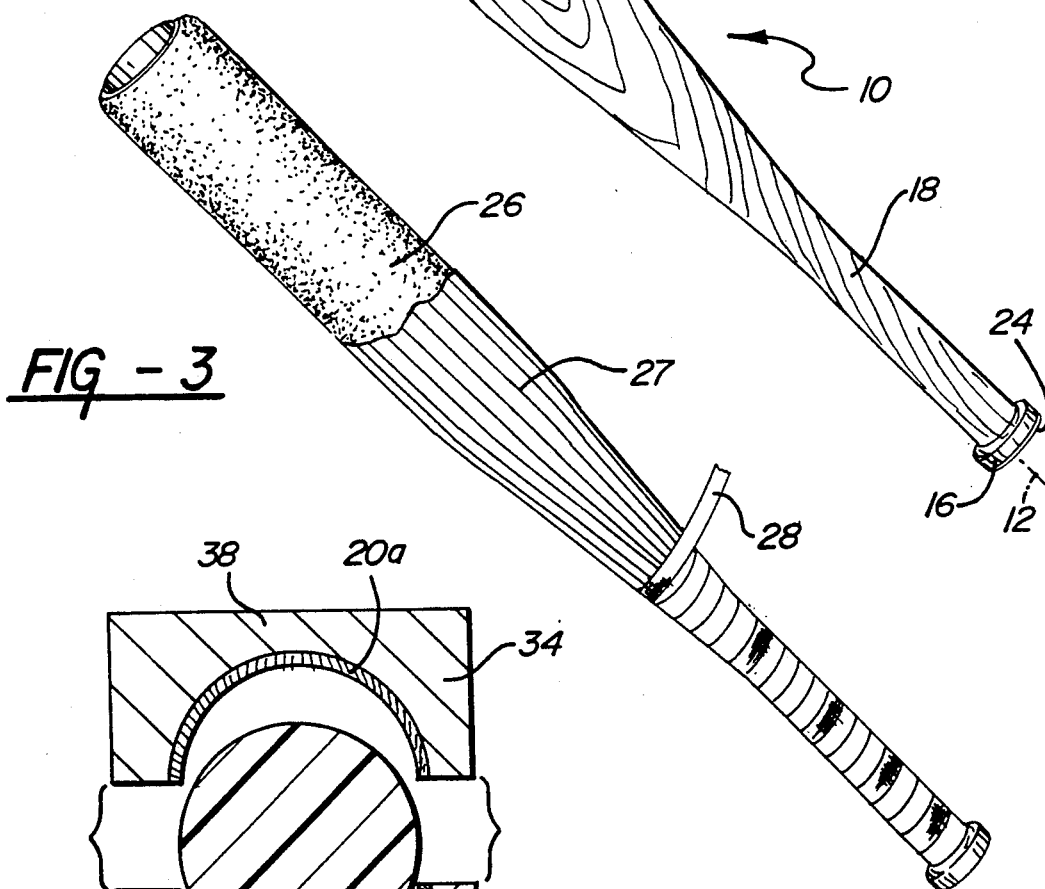

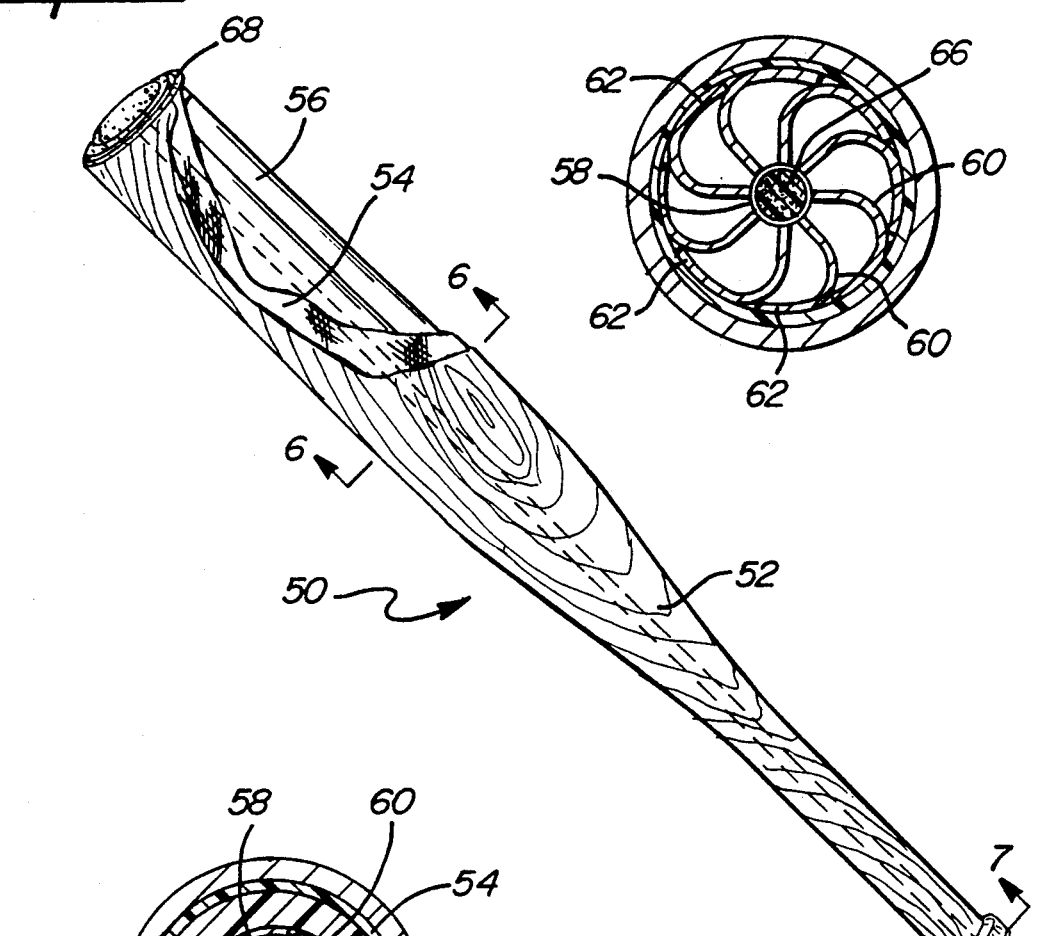

COMPOSITE BASEBALL BAT

FIELD OF THE INVENTION

This invention relates to baseball bats or like articles formed as true composites, each having a central core covered by a laminated reinforcing sheath consisting of an outer layer of structural wood veneer or veneers which are impregnated with resin and adhered to an inner layer of synthetic fiber reinforcing materials and resin.

BACKGROUND OF THE INVENTION

Baseball bats and like articles are traditionally made of solid wood. These articles are relatively expensive and frequently break in use. Moreover, it is difficult by natural limitations to design these products so that they will have sufficient strength as well as required functional properties such as weight, balance and flexibility, to resist breakage.

As a result of these deficiencies, extruded tubular aluminum bats have been recently extensively used for baseball and softball games but have not been generally adapted for professional play because of limitations on weight, strength, sound, performance and the traditional aesthetic preference for wood.

SUMMARY OF THE INVENTION

It is accordingly an object of the present invention to provide a baseball bat or like article which utilizes structural exterior wood veneer layers as a laminate designed to complement and work with an inner layer or layers of synthetic reinforcing material and a central core to produce a engineered composite with the desired weight, strength, stiffness and flexibility to produce a bat with superior performance characteristics and a longer life than either the solid wood or extruded aluminum bats. The products of the present invention (hereinafter generically referred to and described in the form of a bat) are formed from one or more outer layers of relatively thin, structural, wood veneer adhered to an inner laminate layer by resin which impregnates both layers. The veneer layer is the outermost layer of the bat and it overlies and protects a layer or layers of fiber reinforced materials such as graphite, fiberglass, Kevlar or a combination thereof, in which the cord arrangement is specifically designed to withstand the intended loads without failure. These materials are generically referred to hereinafter as "fibrous reinforcement fabrics." The fibrous reinforcement fabric is in turn impregnated with and bonded by resin to both the innermost core layer and outermost wood layer so as to create a unitary composite structure. The space within the fibrous reinforcement fabric is filled with an elongated, substantially rigid, central core.

If the bat of the present invention were to be formed without the outer wood veneer layer, the fibrous reinforcement fabric would be susceptible to failure by sheer/impact breaking. Since the contact between the bat and the ball is initially a point contact, the loading forces at that point of contact are extremely high. The wood layer acts to distribute these impact loads over a wide area and a large number of fibers, thereby decreasing the loading on individual fibers and cords and allowing the bat to withstand the high forces imposed when the ball and bat meet. In the preferred embodiment of the bat the wood grain is arranged longitudinally along the length of the bat. When bending moments are imposed on the bat by virtue of the tandem forces imposed between the point of impact of the ball with the bat and the handle of the bat, the cellose fibers of the wood limit the elongation of the bat on the side contacting the ball.

A baseball bat formed in accordance with the preferred embodiment of the invention has the appearance of a conventional solid wood bat. The superior strength and performance of the bat is derived from a tensile, impact and compression properties of the wood veneer coupled with the stiffness, tensile and compressive strength and shear resistance of the fibrous reinforcement fabric materials and the stiffness and lightweight properties of the core. The cross section of the core and the amount and thickness of the wood, type of wood, the amount, type, weave, knit and the direction of the cords within the fiber layers and the core material density and physical properties may all be varied throughout the thickness and length of the bat to distribute the weight and strength in the most advantageous manner consistent with the intended usage, such as hardball or softball or as a child's or adult's bat.

The core and its surrounding layers are preferably tapered along the length of the bat from a maximum diameter adjacent the top of the bat (the butt end) to a minimum diameter adjacent the handle. The core preferably flares out at the bottom of the bat to form a rounded knob.

The central core, having the general shape of the final bat, but smaller dimensions is first covered with fiber cloth formed with high tensile strength fibers, or continuous cords preferably of carbon Kevlar, or glass materials. The fibrous reinforcement fabric covers the entire outer surface of the core and if necessary, disk-like sections of fibrous reinforcement fabric may be applied to the knob end and butt end of the bat. The fibrous reinforcement fabric may be woven or knitted or formed of randomly arrayed fibers. In a preferred embodiment to the invention, which will subsequently be disclosed in detail, the core is first covered with two elongated sections of fibrous reinforcement fabric, each extending the full length of the bat, and each having a width which varies along its length so that when the two sections are laid over the core their edges abut, forming two seams on diametrically opposed sides of the bat. Alternatively, the edges of the sections may overlap one another. The fabric from which these sections are formed preferably includes at least two groups of fibers or continuous cords. One group runs longitudinally so as to extend along the length of the bat. The other fiber group extends at right angles to the first group, or circumferentially about the bat, or alternatively, the fabric may include second and third fiber groups arrayed at angles of 45° to the longitudinally extending fibers on both sides, so that the 45° cords extend at 90° to one another. Preferably, these first two sections, which abut the core, are covered by a pair of similar sections displaced 90° radially relative to the first section so that each of the second sections is centered on one of the longitudinal seams formed between the underlying first sections.

These elongated fibrous reinforcement fabric sections are then preferably covered with elongated strips of fibrous reinforcement fabric which is spirally wound over the elongated sections. The fiber layer may be impregnated with resin prior to lamination through the use of pre-pregs or used in the liquid state during lamination. Any of the wide variety of commercially available synthetic resins for use in forming fibrous reinforcement fabric may be employed.

Before the resin is set the fiber-resin coated core is ready to receive the outer structural wood layers or layer which are resin-coated to ensure proper bonding. The wood layers are in the form of one or more planks or strips which are preformed and cut to desired shape and size. The composite is then pressed together through the use of split molds, vacuum bag or the like. The molds may also be heated to accelerate cure and allow the use of exotic bonding resins which cannot be worked at room temperature.

In the preferred embodiment the wood veneer strips and spirally wound tape extend slightly over the top end of the bat and the bottom or butt end of the bat, leaving the fibrous reinforcement fabric caps exposed and covering the core at those ends. The wood veneer planks are preferably cut from a single sheet so that the grain structures of adjacent planks match one another giving the finished bat the appearance of a conventional wood bat. The wood grains are preferably arrayed longitudinally along the length of the bat so that the tensile strength and impact resistance of the wood in the longitudinal direction is maximized.

The resulting wood composite bat has a traditional aesthetic appearance yet optimal weight, strength, life and performance characteristics.

In an alternative embodiment of the invention, the central core is further reinforced by the use of an extruded aluminum tube, preferably having radial extending fins projecting from circumferentially spaced intervals about its outer surface. The outer edges of the fins abut the inner surface of the fiber reinforced shell. The area surrounding the central tube and fins of the extrusion is preferably filled with a cellular foamed plastic.

The invention allows the bat to be a fully engineered structure (true composite) wherein the wood, synthetic reinforcing materials, resin and core all are synergistic in nature and result in a completely novel and desirable physical structure. The dynamics of swing and impact between the bat of the present invention and a ball are far superior to those of either a solid wood bat or an aluminum bat.

Other objectives, advantages and applications of the invention will be made apparent by the following detailed description of the preferred embodiments. The descriptions make reference to the accompanying drawings in which:

DETAILED DESCRIPTION OF THE DRAWINGS

FIG. 1 is a perspective view, partially broken away for purposes of illustration, of a baseball bat forming a preferred embodiment of the present invention, made in accordance with the process of the present invention;

FIG. 2 is a cross section of the bat of FIG. 1 taken along line 2—2 of FIG. 1;

FIG. 3 is an illustration of the bat of FIG. 1 during the process of forming the bat by wrapping a central core, covered with longitudinally extending sections of synthetic reenforcing fabric with tape formed of high tensile filaments;

FIG. 4 is a sectional view through a split mold used to form the bat of FIG. 1;

FIG. 5 is a perspective view of a bat representing an alternative embodiment of the invention having a radially finned extruded aluminum core;

FIG. 6 is a sectional view through the bat of FIG. 5, taken midway along its length;

FIG. 7 is a cross-sectional view through the butt end of the bat of FIG. 5; and

FIG. 8 is a cross section through another alternative form of a bat formed in accordance with the present invention having a different form of extruded aluminum core.

DETAILED DESCRIPTION OF THE PREFERRED EMBODIMENTS

While the preferred embodiments of the structure of the present invention are illustrated in the form of baseball bats, it should be recognized that the present invention contemplates a class of articles which have traditionally been formed from solid wood such as paddles, oars and the like and the baseball bats described hereinafter should be considered representative of that class of articles.

The baseball bat forming a preferred embodiment to the invention is illustrated in FIGS. 1 and 2. The bat, generally indicated at 10, has an outer configuration, and dimensions, like that of conventional prior art bats which are formed of solid wood or aluminum tubing. The bat 10 is radially symmetrical about a central longitudinal axis 12. Its upper section 14 is relatively thick and it tapers in the direction of a knob end 16 so as to form a smaller diameter handle section 18. The knob end 16 flares outwardly at the lower end of the handle 18.

The outer surface of the bat is covered by a sheath of structural veneer 20 coated and impregnated with an epoxy resin. The outer wood veneer sheath 20 covers the entire bat except for end sections 22 at the top end of the bat and 24 at the butt end of the bat. In the preferred embodiment of the invention, the outer sheath 20 is formed of two longitudinally arrayed strips or "planks" of white ash veneer of approximately 1/8 to 1/16 inch thickness. As will subsequently be disclosed, one or more "planks" are employed. The term "planks" is used because the strips vary in width longitudinally, so that when they are laid in side-by-side abutment with one another they form the outer contour of the bat without overlap. The strips are preferably laid with their grains extending longitudinally along the length of the bat to provide maximum longitudinal tensile strength and impact resistance.

The veneer cover 20 overlays a core section 26 preferably formed of high density urethane foam covered by strips of fibrous reinforcement fabric 28 of a woven or knitted graphite fiber. The central core 26 is molded into the contour of the finished bat preferably employing a self-foaming reaction within a closed split mold (not shown). The foam preferably has a density of about 10 lbs/cu.ft. and the density may typically range between 5 and 15 lbs/cu.ft.

As illustrated in FIG. 3, the molded core 26 is then covered with two longitudinally extending strips 27 of a knitted or woven graphite fibrous reinforcement fabric with the main cords on a zero degree axis running the length of the bat with one or more cross cords running at 45 degree angles or 90 degree angles to the main cord. This cloth is commercially available as for example Hexcell T584 woven roving. This layer may be patterned to full, ½ or ⅓ sections or the like and may be overlapping. Alternatively, or in addition a further spiral wound layer 28 of two inch woven or knitted graphite tape (not shown) may then be wound over the above graphite in overlapping fashion, one turn to another, continuously from butt end to knob end. The top end of the of the core is covered by a disk-shaped sheet 22 of woven graphite fabric and the butt end of the core is similarly covered by a smaller diameter disk 24 of graphite fiber fabric. The end sections of the spirally wound tape preferably overlap the end caps 22 and 24 to retain them in place.

Referring to FIG. 4, a split female die 5 consisting of an upper section 34 and a lower section 36, each having a cavity 38 and 40 respectively, contoured to the desired outer configuration of the bat, is used to finish the bat. Each of the mold cavities 38 and 40 is lined with one or more "planks" of the white ash veneer. The width of the plank sections varies along their length so that their edges will abut to form the desired outer configuration of the bat. In FIG. 4, each of the cavities 38 and 40 is lined with one veneer plank 20a in the upper die cavity 38 and one plank 20b in the lower die cavity 40. After insertion in the mold cavity, the planks 20a and 20b are impregnated with the same epoxy resin as the tape 28, and the tape wound core, with the epoxy resin coating still in a fluid state, is inserted within the molds and the molds are closed. Depending upon the resin employed, the molds may be pressured together and may be heated to accelerate the curing of the resin. After the resin is fully cured, the finished bat is removed from the mold. The wood surface will be fully visible, giving the bat the same appearance to an all-wood bat. The end caps 22 and 24 of the woven fiber material will be exposed, giving the bat a distinctive appearance.

To simplify the preprocessing, the planks of wood veneer 20a and 20b may be pre-formed into curved shape before insertion in the cavities 38 and 40 of the dies 34 and 36. This is done by first soaking the veneer planks and then placing them in molds shaped like the die cavities 38 and 40. They are then steam bagged for a sufficient time to remove the memory of their original shape and are then allowed to fully dry. They may then be removed and placed as inserts within the die cavities 38 and 40.

Alternative forms of cores may be employed and articles formed in accordance with the present invention. FIGS. 5, 6 and 7 disclose a bat, generally indicated at 50, having a sheath of the same type as the embodiment of FIG. 1, with an outer layer of resin-coated wood veneer planks 52 formed over an inner layer of fibrous reinforcement fabric woven or knitted and is formed over a central extruded aluminum/plastic core 56. The core, illustrated in cross section in FIGS. 6 and 7, consists of a relatively small diameter hollow tube 58, formed with radially extending fins 60 which extend the full longitudinal end of the bat. The fins 60 are curved in a circumferential direction so that their radially outer ends 62 are tangential to the inner surface of the fiber reinforced sheath. The radial extension of the fins 60 varies along the length of the bat to provide an outer surface of similar dimensions to the foamed core member 26 employed in the embodiment of FIG. 1.

The diameter of the central tube 58 is preferably constant along the length of the core member but the radial extension of the fins 60 varies along the length. This variation may be created by an extrusion technique in which the extrusion orifice configuration is modified progressively or alternatively by a casting technique. The cross section of the core at the butt end, illustrated in FIG. 7, when compared to the cross section of cores taken through the central part of the bat, as viewed in FIG. 6, illustrates the progressive decrease in diameter of the outer diameter of the fins along the length of the bat. The central void within the tube 58 may be filled with a plastic foam 66. Alternatively, the spaces between the fins 60 may also be filled with plastic foam or resin.

Disk-shaped top and bottom end caps 68 and 70, of fibrous reinforcement fabric respectively, finished off the areas uncovered by the tape 54.

Another alternative form of core of the devices of the present invention is illustrated in FIG. 8, like the other embodiments the core is covered by a layer of resin-impregnated fibrous reinforcement fabric 70, in turn covered by an outer layer of resin-impregnated wood veneer strip 72.

The core of the embodiment of FIG. 8, generally indicated at 76, is formed of aluminum having a cartwheel shape, consisting of an outer tube 78 with an inner structure of radial spokes 80 extending from a central point 82. Again, the radial dimensions of the core 76 will vary along the length of the article. The aluminum core may be formed by extrusion or casting.

I claim:

1. A ball bat having a bulbous end portion tapering to a narrow handle portion comprising:
   a substantially rigid, elongated central core, extending substantially the full length of the bat;
   an inner tube of fibrous reinforcement fabric impreganted with resin, surrounding the core; and
   an outer tube formed of a sheet of wood veneer, said sheet comprising an elongated strip having its length substantially parallel to the longitudinal axis of the bat, said sheet being coated and impregnated with resin, and surrounding said inner tube and adhered thereto by said resin.

2. The bat of claim 1 wherein said central core has a central cavity extending along at least a portion of its length.

3. The bat of claim 2 wherein at least a portion of said central cavity is filled with a cellular material.

4. The bat of claim 1 wherein said central core includes a plurality of longitudinal fins extending substantially radially from a central portion.

5. The bat of claim 4 wherein said fins are curved in a circumferential direction with respect to the central axis of the bat.

6. The bat of claim 4 further including cellular material disposed between said fins and forming sections bounded on their radially outer sides by said inner layer of fibrous reinforcement fabric.

7. The bat of claim 1 wherein the tube of fibrous reinforcement fabric impregnated with resin, surrounding the core, comprises at least one elongated section of fibrous reinforcement fabric, including longitudinally continuous cords, extending the length of the bat.

8. The bat of claim 7 wherein said inner tube of fibrous reinforcement fabric impregnated with resin, surrounding the core, further includes a spirally wound tape of fibrous reinforcement fabric overlying said elongated section of fibrous reinforcement fabric and impregnated with resin.

9. The bat of claim 7 wherein said outer tube formed of a resin coated wood veneer consists of a pair of elongated planks of wood veneer overlying said inner layer of fibrous reinforcement fabric.

10. A ball bat having a bulbous end portion tapering to a narrow handle portion, comprising:

a substantially rigid, elongated central core, extending substantially the full length of the bat;

a first tubular layer of fibrous reinforcement fabric overlying the core; a second tubular layer of wood veneer overlying the fibrous reinforcement fabric, said wood veneer comprising an elongated strip having its length substantially parallel to the longitudinal axis of the bat;

the first and second layers being impregnated with and adhered to one another and to the outer surface of the core by synthetic resin so as to form a unitary structure.

11. The bat of claim 10 wherein said first layer of fibrous reinforcement fabric comprises a plurality of elongated strips having widths varying along their lengths, overlying said core and extending longitudinally therealong, with the strips abutting one another at their longitudinal edges.

12. The bat of claim 10 wherein said first layer of fibrous reinforcement fabric comprises a plurality of elongated strips having widths varying along their lengths, overlying said core and extending longitudinally therealong, with the strips overlapping one another at their longitudinal edges.

13. The bat of claim 11 wherein said first layer of fibrous reinforcement fabric further comprises an elongated strip of fibrous reinforcement fabric tape spirally wound over said elongate strips of fibrous reinforcement fabric.

14. The bat of claim 10 wherein the fibrous reinforcement fabric is formed of fibers or cords of Kevlar, graphite, or glass or combinations thereof.

15. The bat of claim 14 wherein the fibrous reinforcement fabric is woven.

16. The bat of claim 14 wherein the fibrous reinforcement fabric is knitted.

17. The bat of claim 14 where the fibrous reinforcement fabric is formed of randomly oriented strands.

18. The bat of claim 14 where the fibrous reinforcement fabric is formed of directionally oriented cords.

19. The bat of claim 10 wherein the central core is formed of foamed plastic.

20. The bat of claim 10 wherein the central core is formed of a balsa core material.

21. A ball bat having a bulbous end portion tapering to a narrow handle portion comprising an elongated tube of fibrous reinforcing fabric and a tube formed of a sheet of wood veneer, said sheet comprising an elongated strip having its length substantially parallel to the longitudinal axis of the bat, the sheet surrounding and encasing the fibrous reinforcing fabric tube, the fabric tube and the wood veneer sheet each being impregnated with and adhered to one another by resin.

22. The bat of claim 21 wherein said tube of wood veneer is formed of two longitudinally extending strips with meeting longitudinal edges.

23. The bat of claim 21 in which the tube of wood veneer has a thickness of between approximately ⅛ and 1/16 of an inch.

24. The bat of claim 21 wherein said wood is a hardwood.

25. The bat of claim 21 further including a central core filling said fabric tube and comprising a foam plastic.

* * * * *